United States Patent
Horii et al.

(10) Patent No.: US 10,104,085 B2
(45) Date of Patent: Oct. 16, 2018

(54) PERMISSION BASED ACCESS CONTROL FOR OFFLOADED SERVICES

(71) Applicant: INTERNATIONAL BUSINESS MACHINES CORPORATION, Armonk, NY (US)

(72) Inventors: Hiroshi H. Horii, Tokyo (JP); Takuya Mishina, Kanagawa (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 482 days.

(21) Appl. No.: 14/960,963

(22) Filed: Dec. 7, 2015

(65) Prior Publication Data
US 2017/0163644 A1 Jun. 8, 2017

(51) Int. Cl.
*H04L 29/06* (2006.01)
*H04L 29/08* (2006.01)

(52) U.S. Cl.
CPC .............. *H04L 63/10* (2013.01); *H04L 63/02* (2013.01); *H04L 67/1002* (2013.01); *H04L 67/1097* (2013.01); *H04L 67/16* (2013.01); *H04L 67/32* (2013.01)

(58) Field of Classification Search
None
See application file for complete search history.

(56) References Cited

U.S. PATENT DOCUMENTS

| | | | | |
|---|---|---|---|---|
| 7,475,138 B2* | 1/2009 | Graveline | ........... | H04L 63/0227 709/225 |
| 7,853,953 B2* | 12/2010 | Devarakonda | ........ | G06F 9/5027 718/105 |
| 8,245,281 B2* | 8/2012 | Cheeniyil | ............... | H04L 63/20 455/515 |
| 8,938,613 B2* | 1/2015 | Burch | ....................... | H04L 9/14 713/153 |
| 9,660,960 B2* | 5/2017 | Phonsa | ............... | H04L 63/0263 |
| 2004/0225895 A1* | 11/2004 | Mukherjee | .......... | H04L 12/4633 726/15 |
| 2012/0204187 A1 | 8/2012 | Breiter et al. | | |
| 2012/0281708 A1 | 11/2012 | Chauhan et al. | | |

(Continued)

OTHER PUBLICATIONS

Firestone, Daniel, "VFP: A Virtual Switch Platform for Host SDN in the Public Cloud", 2017, Usenix.org, p. 1-15.*

(Continued)

*Primary Examiner* — Jeffery Williams
(74) *Attorney, Agent, or Firm* — Tutunjian & Biteto, P.C.; Vazken Alexanian

(57) ABSTRACT

Systems and methods for network access control, including sending a service request from an on-premise system to one or more offloaded front-end services on one or more offloading servers. The requests by the offloaded services to access back-end services in one or more on-premise systems are monitored, and access requests by the offloaded services for unauthorized back-end services are denied. The service request is redirected and locally executed to generate logs of the back-end services used to perform the service request if the access requests are denied. A permission mapping in a firewall between the offloaded services and the logged back-end services is updated to permit future access requests by the offloaded services.

20 Claims, 7 Drawing Sheets

(56) References Cited

U.S. PATENT DOCUMENTS

| | | | |
|---|---|---|---|
| 2015/0003253 A1 | 1/2015 | Wolfner et al. | |
| 2015/0124622 A1* | 5/2015 | Kovvali | H04W 28/0215 |
| | | | 370/236 |
| 2015/0341377 A1* | 11/2015 | Kasturi | H04L 63/1416 |
| | | | 726/23 |
| 2016/0119165 A1* | 4/2016 | Keronen | H04L 12/4633 |
| | | | 370/254 |
| 2016/0301762 A1* | 10/2016 | Strijkers | H04L 67/16 |
| 2016/0301779 A1* | 10/2016 | Cui | H04L 45/308 |
| 2016/0359809 A1* | 12/2016 | Phonsa | H04L 63/0263 |
| 2017/0366433 A1* | 12/2017 | Raleigh | H04W 4/24 |

OTHER PUBLICATIONS

Gessert et al., "Towards a Scalable and Unified REST API for Cloud Data Stores", 2014, Database and Information Systems Group, University of Hamburg, p. 723-724.*

Hadjiantonis, A.M.,"Implementation of a Cloud-Assisted REST Service Interface for Policy-Based Data Offloading", Journal of Communications Engineering and Networks, Jan. 2014, pp. 1-13, vol. 2 Iss. 1.

* cited by examiner

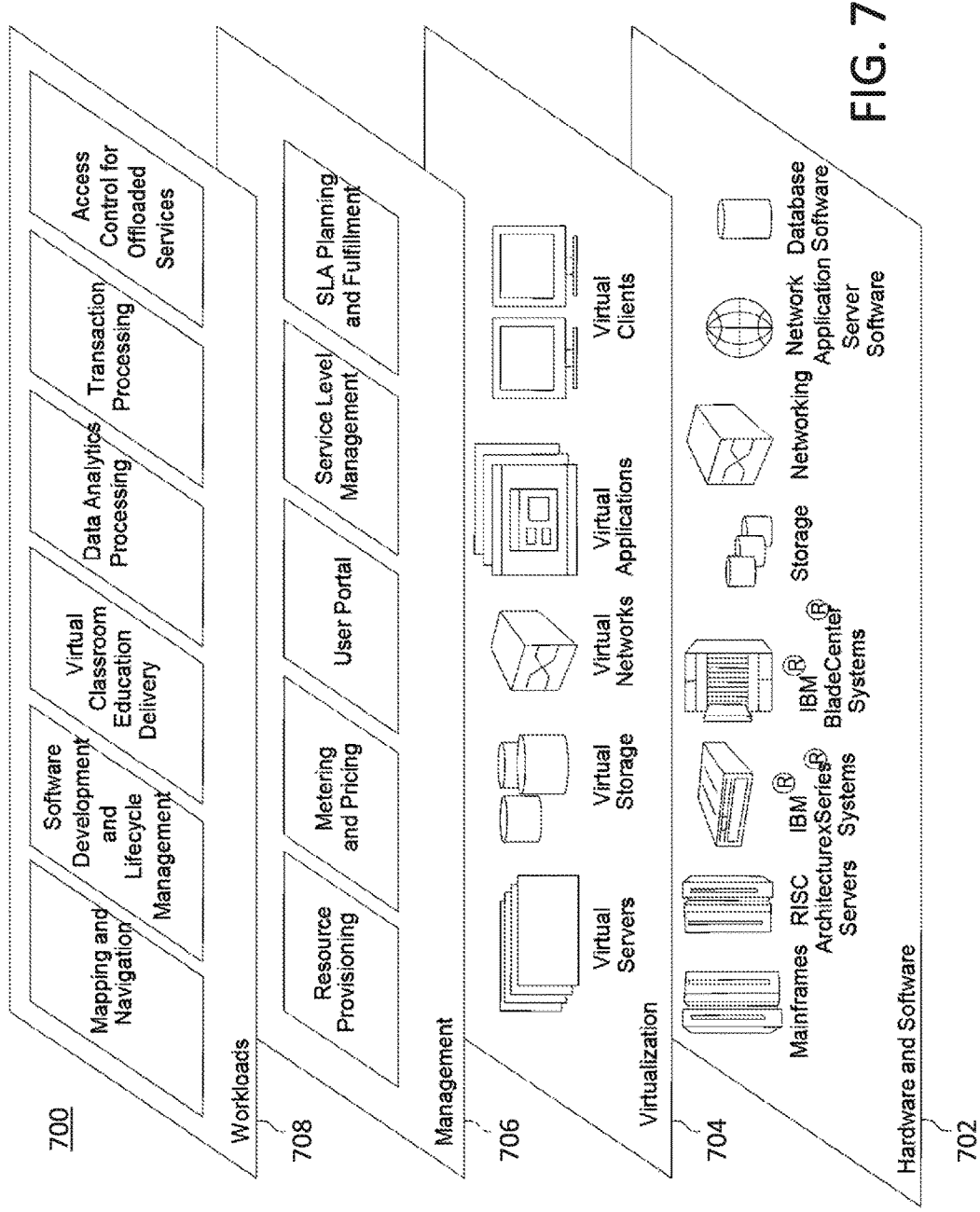

PERMISSION BASED ACCESS CONTROL FOR OFFLOADED SERVICES

BACKGROUND

Technical Field

The present invention relates to access control for cloud-based services, and more particularly to permission based access control for cloud-based offloaded services.

Description of the Related Art

Cloud computing refers to the practice of transitioning computer services (e.g., computation or data storage) to multiple redundant offsite locations available on the Internet, which allows application software to be operated using internet-enabled devices. Clouds can be classified as public, private, and hybrid. Cloud computing (e.g., "the cloud"), may also involve shared resources, and various access control systems and methods for establishing and/or enforcing permissions when allocating resources to users. In cloud computing, a portion of on-premise services may be offloaded to a public cloud, and these services may require access to on-premise backend services (e.g., database services, representational state transfer (REST) services, etc.) to function properly.

When users use public (e.g., non-trusted) clouds to offload workload of their on-premise applications, the offloaded workload/service accesses the back-end services that the on-premise services call. Because back-end services are accessible to the public cloud, the back-end services are generally protected (e.g., using access control lists (ACLs)) for security purposes for a plurality of reasons. For example, some on-premise back-end services (e.g., services in a private cloud) may be restricted from access by an offloaded service (e.g., services in public cloud) without appropriate permissions. In such situations, conventional systems return an error if unauthorized access to a back-end service from an offloaded service is detected, and the offloaded service is not permitted to access the back-end service.

To allow access to on-premise back-end services from public clouds where applications have offloaded workloads, conventional systems and methods may employ a firewall which knows a complete (e.g., perfect) list of accessible back-end services for each offloaded workload prior to requesting a service. However, such a list is impractical (e.g., prohibitively expensive, resource intensive, etc.), or impossible to determine prior to requesting a service and/or maintain in a plurality of scenarios (e.g., unknown behavior from the public cloud, no knowledge of all back-end services required for a particular offloaded service, etc.). Thus, conventional practice is often to set a firewall policy which accepts all requests from offloaded servers, but offloaded servers may not all be trusted and/or may access illegal backend services, which is unacceptable for users requiring secure offloading of services.

SUMMARY

A method for network access control, including sending a service request from an on-premise system to one or more offloaded front-end services on one or more offloading servers. The requests by the offloaded services to access back-end services in one or more on-premise systems are monitored, and access requests by the offloaded services for unauthorized back-end services are denied. The service request is redirected and locally executed to generate logs of the back-end services used to perform the service request if the access requests are denied. A permission mapping in a firewall between the offloaded services and the logged back-end services is updated to permit future access requests by the offloaded services.

A system for network access control, including a controller for sending a service request from an on-premise system to one or more offloaded front-end services on one or more offloading servers. A network monitor detects requests by the offloaded services to access back-end services in one or more on-premise systems, and access requests by the offloaded services for unauthorized back-end services are denied. A controller controls redirecting and locally executing the service request to generate logs of the back-end services used to perform the service request if the access requests are denied. A firewall is configured to permit the access requests by the offloaded services by updating a permission mapping in the firewall between the offloaded services and the logged back-end services.

A computer readable storage medium comprising a computer readable program for providing access to one or more back-end services in a private cloud by one or more offloaded services in a public cloud, wherein the computer readable program when executed on a computer causes the computer to perform steps including sending a service request from the private cloud to one or more offloaded front-end services in the public cloud. The requests by the offloaded services to access back-end services in one or more on-premise systems are monitored, and access requests by the offloaded services for unauthorized back-end services are denied. The service request is redirected and locally executed to generate logs of the back-end services used to perform the service request if the access requests are denied. A permission mapping in a firewall between the offloaded services and the logged back-end services is updated to permit future access requests by the offloaded services.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 7 depicts abstraction model layers, in accordance with an embodiment of the present principles.

DETAILED DESCRIPTION

Figure 1:
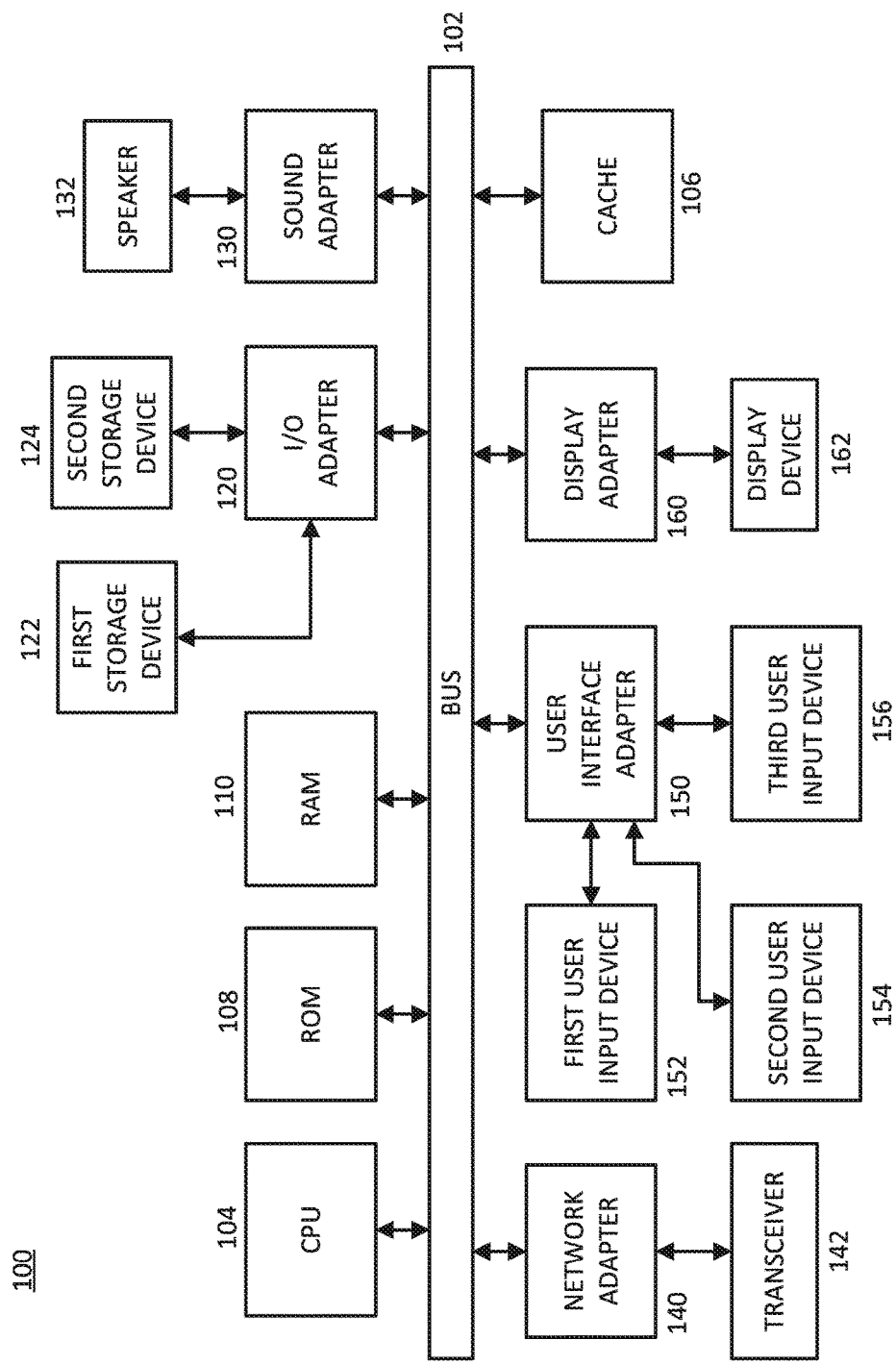
FIG. 1 is a block diagram depicting an exemplary processing system to which the present principles may be applied, in accordance with an embodiment of the present principles.

In accordance with embodiments of the present principles, systems and methods for permission based access control for cloud-based offloaded services are provided. In a particularly useful embodiment, a firewall for a private cloud may be automatically and/or dynamically updated according to the present principles to permit real-time access to back-end services located in the private cloud by front-end services (e.g., untrusted services) offloaded to a public cloud from the private cloud.

A service request may be sent from a system within the private cloud, and an on-premise dispatcher (e.g., router, HTTP workload dispatcher, etc.) may identify which service requests can be offloaded to the public cloud and may dispatch requests to the public cloud based on the status of the on-premise system. For example, an administrator may indicate which service requests to offload to the public cloud, and application developers may list front-end services that can be offloaded. The administrator (or system (e.g., because of system policies) may select which services to offload based on a plurality of reasons, including, for example, system workload according to various embodiments of the present principles.

In an embodiment, offloaded workloads/services in the public cloud may access on-premise backend services via a firewall, and the firewall knows (e.g., because of system policy, administrator settings, etc.) which back-end services each offloaded workload may access. When an offloaded service (e.g., offloaded workload) attempts to access a back-end service that the firewall policy does not allow the offloaded service access to, the firewall may deny the access and may report an error to the on-premise dispatcher. The dispatcher/router may then re-dispatch the same request to on-premise systems (e.g., servers).

The on-premise systems may monitor and store the back-end services being requested by the offloaded services, and may locally re-execute the offloaded services with unauthorized access. When the on-premise systems process the request, the firewall may monitor and list the back-end services for which the offloaded services previously requested access, and a permission mapping between the service in the private cloud and a back end service used by the offloaded service in the public cloud may be generated. This mapping may be recorded in a permission list for allowing future access to the back-end services by the offloaded services (e.g., upon approval of administrators, automatically based on system policy, etc.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, an exemplary processing system 100, to which the present principles may be applied, is illustratively depicted in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that system 100 described below with respect to FIG. 1 is a system for implementing respective embodiments of the present principles. Part or all of processing system 100 may be implemented in one or more of the elements of systems 200, 400, 500, 600, and 700 of FIGS. 2, 4, 5, 6, and 7, respectively.

Figure 2:
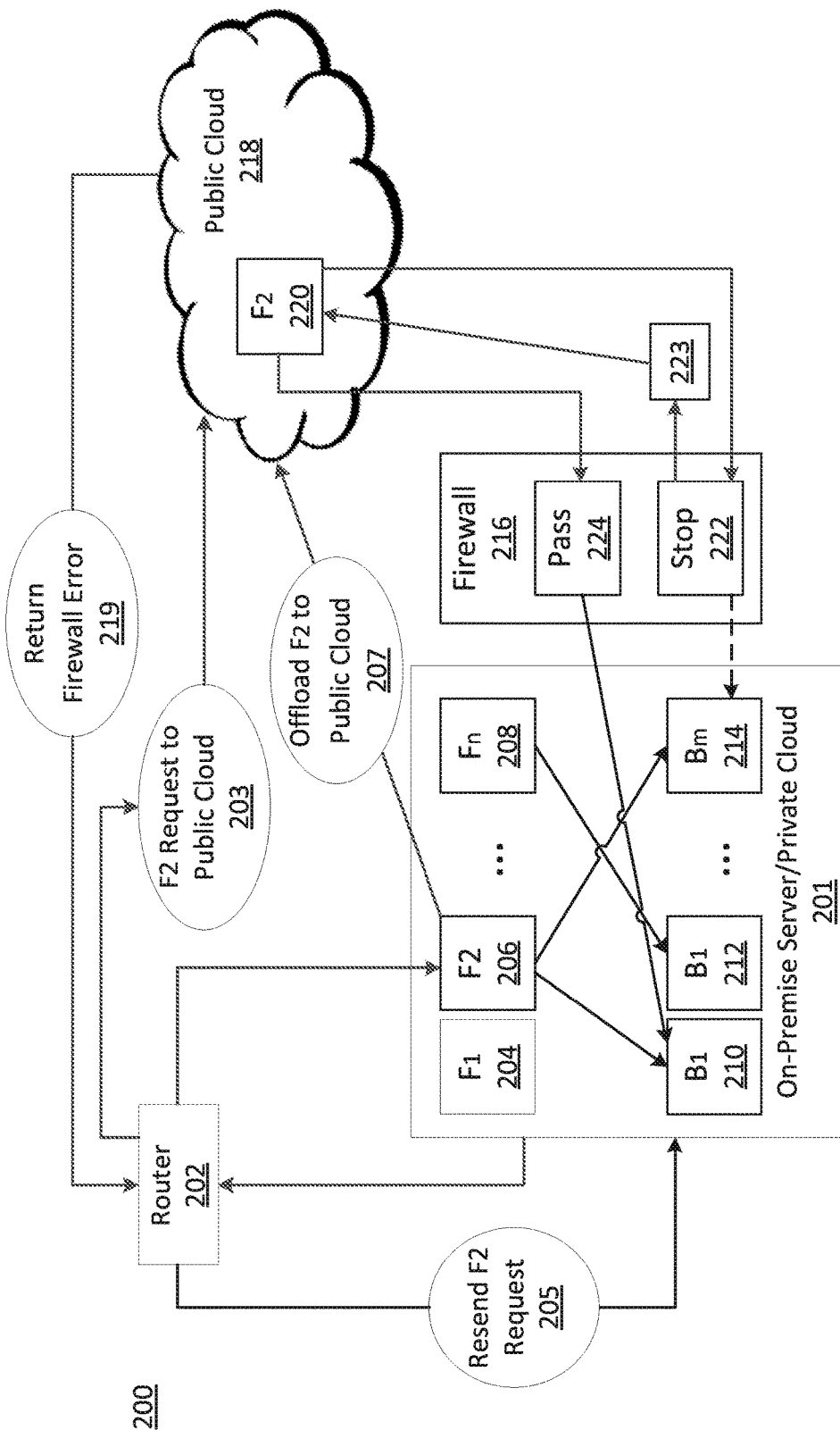
FIG. 2 depicts an exemplary system/method for access control in a cloud computing environment, in accordance with an embodiment of the present principles.
Figure 3:
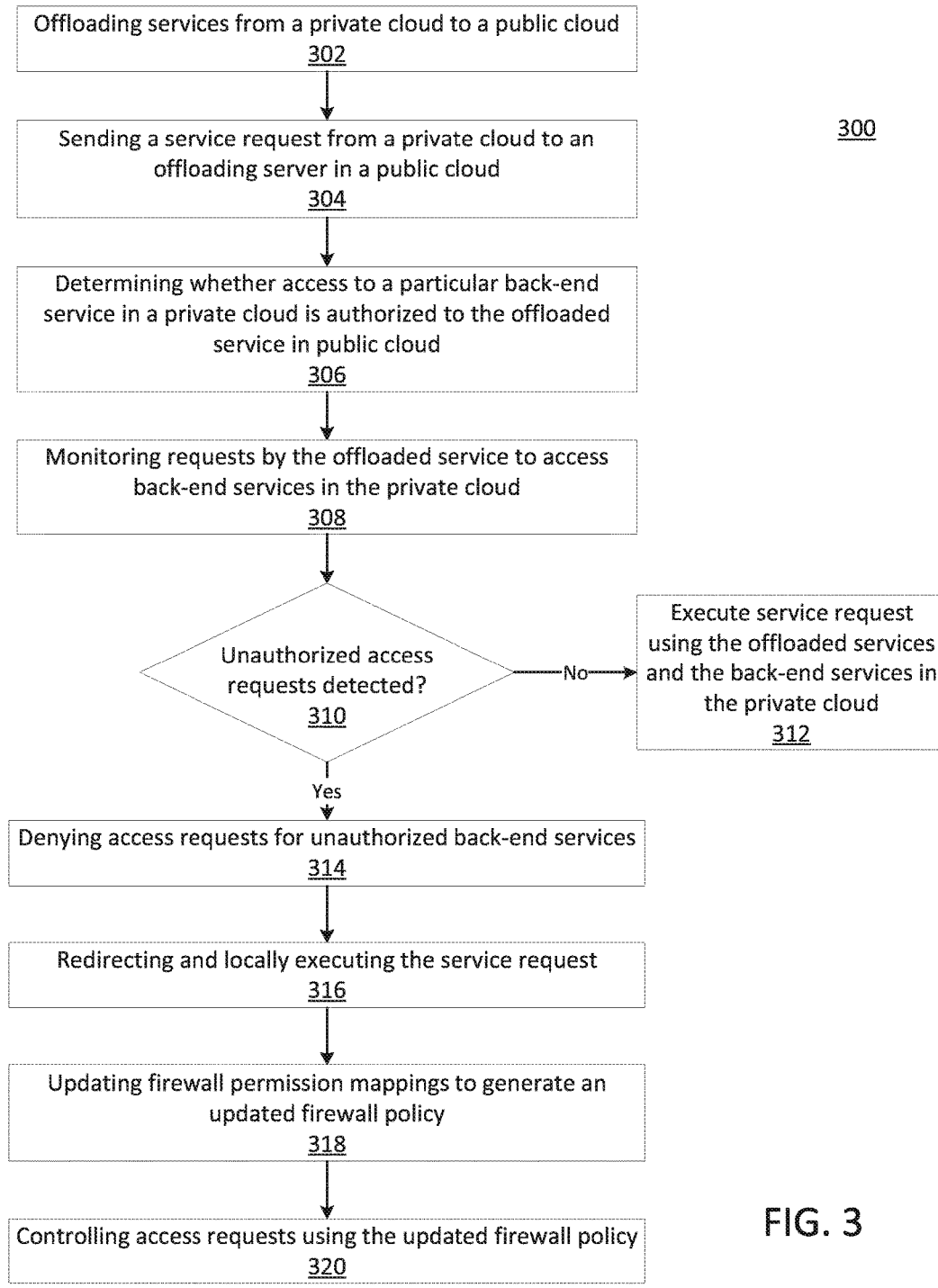
FIG. 3 is a block/flow diagram depicting an exemplary method for access control in a cloud computing environment, in accordance with an embodiment of the present principles.

Further, it is to be appreciated that processing system 100 may perform at least part of the method described herein including, for example, at least part of methods 200 and 300 of FIGS. 2 and 3, respectively. Similarly, part or all of systems 200, 400, 500, 600, and 700 of FIGS. 2, 4, 5, 6, and 7 may be used to perform at least part of methods 200 and 300 of FIGS. 2 and 3, respectively.

Referring now to FIG. 2, a system for access control for offloaded services in a cloud-based environment 200 is illustratively depicted in accordance with one embodiment of the present principles. In some embodiments, the system 200 may build firewall policy based on workload profiling for services offloaded to, for example, PaaS.

In one embodiment, an on-premise system 201 (e.g., server, private cloud, etc.) may be connected to a router 202, and the on-premise system 201 may process a plurality of on-premise front-end services 204, 206, 208 (e.g., in a private cloud 201), with each of the front-end services 204, 206, 208 being associated with permissions to access one or more on-premise back-end services 210, 212, 214 in the private cloud. The router 202 may offload one or more of the front-end services 204, 206, 208 to a public cloud 218, and these offloaded services 204, 206, 208 may access the back-end services 210, 212, 214. However, access may be denied to the back-end services, and errors may be returned if the offloaded services are behaving illegally (e.g., unknown behaviors of offloaded front-end services detected).

For ease of understanding, an illustrative example of a system and method of access control according to one embodiment of the present principles will be described in detail. For example, a front-end service $F_2$ 206 may be offloaded to the public cloud 218 in block 207, and the router 202 may dispatch $F_2$ requests to the public cloud 218 in block 203. The offloaded service $F_2$ 220 may then attempt to access on-premise back-end services via a firewall 216. Based on permissions, offloaded service $F_2$ 220 may pass through the firewall 216 in block 224 and access, for example, back-end service $B_m$ 214. However, the same offloaded service $F_2$ 220 may be stopped by the firewall 216 in block 222 if the offloaded service $F_2$ 220 attempts to access back-end service $B_m$ 214, but does not have the appropriate permissions, as illustrated in Table 1 below:

TABLE 1

| Service | Permissions |
|---------|-------------|
| $F_1$ | $B_1$, $B_m$ |
| $F_2$ | $B_1$ |
| $F_3$ | $B_1$, $B_m$ |
| ... | ... |

As shown in Table 1, the offloaded service F2 220 cannot access Bm 214 using conventional systems or methods because the permission for access is not present in the permission list of the firewall 216. Thus, the firewall 216 may protect the on-premise back-end service Bm 214 (and/or other services) by restricting access from services offloaded to the public cloud 218 that do not have the correct permissions for access to particular services in the private cloud 201.

When users employ the public cloud 218 to offload workload of their on-premise applications, the offloaded service/workload F2 220 may access the back-end services that the on-premise services call. Because back-end services are accessible to the public cloud, the back-end services are conventionally protected using a firewall 216 (e.g., based on access control lists (ACLs)).

For security purposes, some on-premise back-end services (e.g., services in a private cloud 201) may be restricted from access from an offloaded service (e.g., services in public cloud 218) for any of a plurality of reasons (e.g., administrators not previously knowing all backend services that each offloaded service requires to function, unpredictable middleware behaviors, newly added applications (e.g., with unknown permission requirements), etc.).

In such situations, conventional systems would return an error if any unauthorized access to a back-end service from an offloaded service is detected, and the offloaded service would not be permitted to access the back-end service (e.g., Bm 214). A firewall 216 may be employed to protect internal resources from external attacks. However, to allow access to on-premise back-end services (e.g., Bm 214) from public clouds 218 where applications have offloaded workloads 220, conventional systems and methods require that the firewall 216 must know (e.g., receive) a complete (e.g., perfect) list of accessible back-end services (e.g., 210, 212, 214, etc.) for each offloaded workload 220 prior to requesting a service.

However, such a list is impractical, or impossible to determine prior to requesting a service in many situations. These situations may include, for example, a denial of access by the firewall 216 because of an unknown behavior from the public cloud, no disclosure by developers to administrators listing all back-end services 210, 212, and 214 required for a particular offloaded service 220 to function, and/or no knowledge of all required (or running) back-end services 210, 212, and 214 by developers (e.g., because a library employed by a front-end service (e.g., 220) implicitly accesses back-end services 210, 212, and 214 (e.g., user authorization, database access, etc.).

In one embodiment, if the offloaded service $F_2$ 220 is not authorized to access a particular back-end service (e.g., $B_m$ 214), the firewall 216 may return an error in block 223 to the offloaded service $F_2$ 220 in the public cloud 218, and a firewall error may be returned from the offloaded service $F_2$ 220 in the public cloud 218 to the router 202 in block 219. The router 202 may then resend the request in block 205 to on-premise servers 201, and the on-premise servers 201 may re-execute the offloaded service $F_2$ 220 according to various embodiments of the present principles.

In some embodiments, permissions and/or mappings may be dynamically maintained in real time according to the present principles. For example, while the on-premise servers 201 are executing (or re-executing) a request of a service, the servers 201 may log (e.g., concurrently, sequentially, predetermined order, etc.) the back-end services (e.g., $B_m$ 214) that the service uses. The on-premise servers 201 may add a mapping (e.g., permission list mapping) from the requested offloaded service $F_2$ 220 and the logged back-end services (e.g., $B_m$ 214) into the permission mappings (e.g., for the firewall 216) for future use by the offloaded service $F_2$ 220, as illustrated in Table 2 below:

TABLE 2

| Service | Permissions |
|---------|-------------|
| $F_1$ | $B_1$, $B_m$ |
| $F_2$ | $B_1$, $B_m$ |
| $F_3$ | $B_1$, $B_m$ |
| ... | ... |

As illustrated in the updated permission list in Table 2 above, access to the back-end service $B_m$ 214 may now be permitted (e.g., automatically, upon administrator approval, etc.) for the offloaded service $F_2$ 220 in future service requests. In one embodiment, after the router 202 dispatches requests of the offloaded service $F_2$ 220 to the public cloud 218 in block 203, the router 202 may re-dispatch requests of the offloaded service $F_2$ 220 to the on-premise servers 201 in block 205 until a new permission list is generated and/or applied to the firewall 216, or other criteria (e.g., threshold) has been met.

In some embodiments, after a mapping is added (e.g., to a permission list), the new mapping may be automatically (or manually) applied to the firewall 216. For example, in one embodiment, the new mapping may be reviewed (e.g., by administrators) before applying the mapping to the firewall 216. However, in other embodiments, such a review may be omitted, and the new mapping may be determined and/or applied automatically (e.g., according to system policy, system requests, etc.) according to the present principles.

It is to be understood that although the above systems and network configuration (e.g., public and private cloud-based) are illustratively depicted to show various embodiments of the present principles, the teachings of the present principles may be applied to any types of systems and/or network configurations according to various embodiments.

Referring now to FIG. 3, a block/flow diagram showing an exemplary method 300 for access control (e.g., for untrusted and/or offloaded services) in a cloud computing environment is illustratively depicted in accordance with an embodiment of the present principles. In some embodiments, a firewall for a private cloud (e.g., network of interconnected on-premise computing systems) may be automatically and/or dynamically updated according to the present principles to permit (or deny) real-time access to back-end services located in the private cloud by services (e.g., front-end services) offloaded from the private cloud to a public cloud (e.g., systems located outside the firewall for the private cloud).

In one embodiment, one or more services (e.g., front-end services) may be offloaded in block 302 from one or more on-premise systems (e.g., located in a private cloud) to one or more offloading servers (e.g., located in a public cloud). In block 304, a service request may be sent (e.g., using a router) from one or more on-premise systems in the private cloud to one or more offloaded front-end services on or more offloading servers in the public cloud. The service request may be speculatively sent to the offloading servers in the public cloud according to various embodiments.

For ease of understanding, speculative execution will be briefly discussed. Speculative execution is an optimization technique where a computer system performs some task that may or may not be actually needed. A main idea is to do work before it is known whether that work will be needed at all, so as to prevent a delay that would have to be incurred by doing the work after it is known whether it is needed. If the work is determined to have been not necessary to perform, any changes made by the work are reverted and the results are ignored. An objective is to provide more concurrency if extra resources are available. Speculative execution may be employed in a variety of fields, including, for example, branch prediction in pipelined processors, prefetching memory and files, and optimistic concurrency control in database systems.

In block 306, a firewall may be employed to determine whether access to particular back-end services in the private cloud is authorized to the offloaded services (e.g., based on firewall policy), and an error may be returned if the access is unauthorized. For example, the firewall may return an error to the offloaded services and the offloaded services may return an error to an on-premise router if an access request is determined to be unauthorized.

In block 308, requests by the offloaded services to access back-end services in the private cloud may be monitored (e.g., to detect requests by the offloaded services for access to unauthorized back-end services) using the firewall according to the present principles. In block 310, if no unauthorized access requests are detected by the monitoring, the service request may be executed in block 312 using the offloaded front-end services in the public cloud and the back-end services in the private cloud. In one embodiment, if an access request for unauthorized back-end services is determined to be detected in block 310, the request to access the unauthorized back-end services may be denied in block 314 (e.g., blocked by a firewall in the private cloud).

In block 316, if the access requests are denied, the service request may be redirected and locally executed to generate and store logs of the back-end services used to perform the service request according to the present principles. In block 318, permission mappings in a firewall may be generated and/or updated between the offloaded services and the logged back-end services to generate an updated firewall policy for authorizing future access requests by the offloaded services. Subsequent access requests to the logged back-end services may be allowed or blocked in block 320 using a controller (e.g., local, global, etc.) based on the updated firewall policy according to various embodiments of the present principles.

Figure 4:
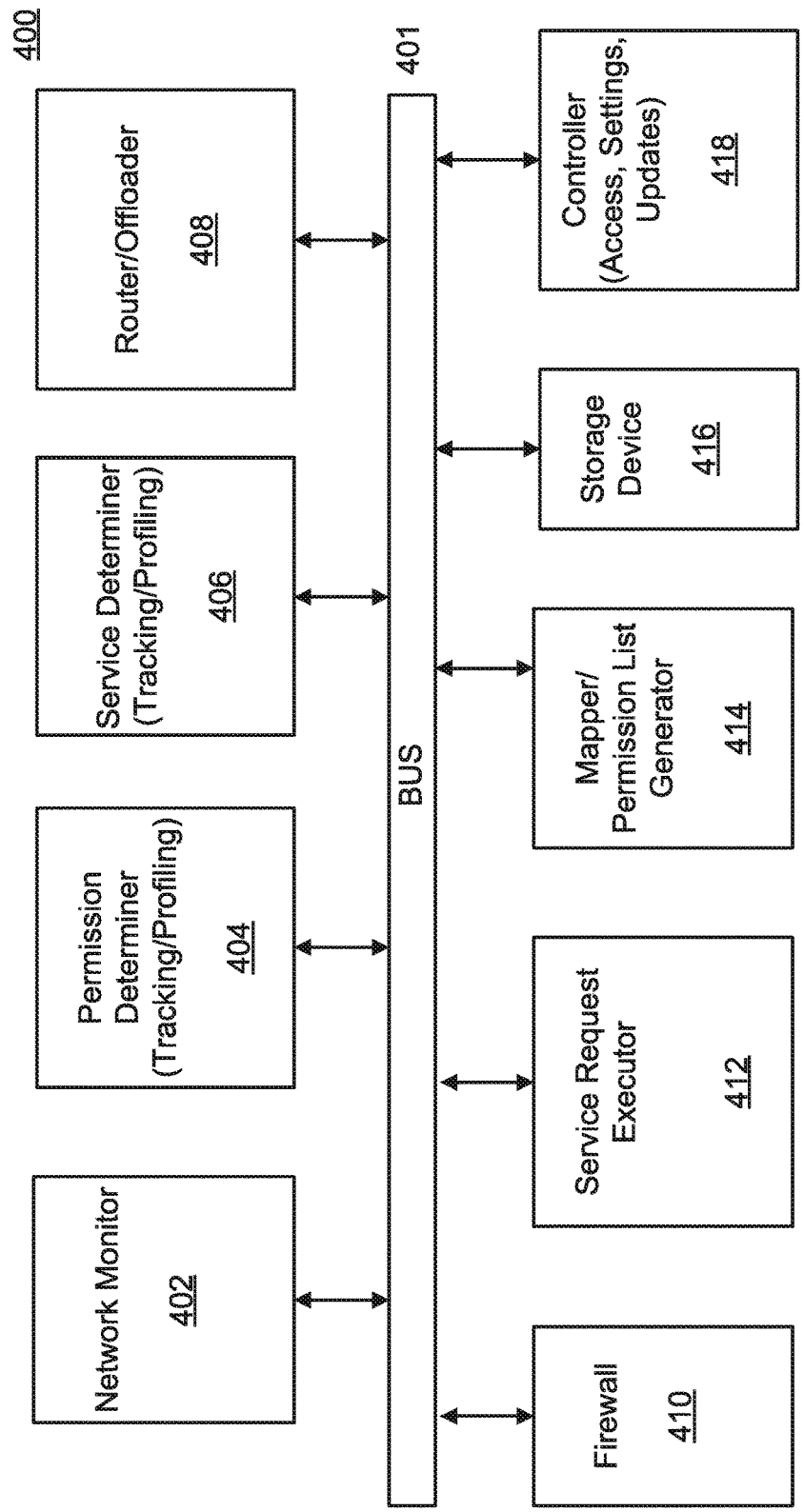
FIG. 4 depicts an exemplary system for access control in a cloud computing environment, in accordance with an embodiment of the present principles.

Referring now to FIG. 4, an exemplary system 400 for access control by generating and dynamically maintaining firewall policies in a cloud computing environment is illustratively depicted in accordance with an embodiment of the present principles. While many aspects of system 400 are described in singular form for the sakes of illustration and clarity, the same can be applied to multiples ones of the items mentioned with respect to the description of system 400.

For example, while a single router/offloader 408 may be mentioned with respect to the system 400, more than one router/offloader 408 can be used in accordance with the teachings of the present principles, while maintaining the spirit of the present principles. Moreover, it is appreciated that the router/offloader 408 is but one aspect involved with system 400 than can be extended to plural form while maintaining the spirit of the present principles.

In one embodiment, the system 400 may include a plurality of modules, which may include one or more network monitors 402, permission determiners 404, service determiners 406, routers/offloaders 408, firewalls 410, service request executors 412, mappers 414, storage devices 416, and/or controllers 418, which may be connected to a bus 401 according to the present principles.

In one embodiment, a network monitor 402 may be employed to monitor a plurality of network events and/or systems to, for example, measure network resource usage, track access requests, track resource usage, etc. A permission determiner 404 may track and/or determine, using a hardware processor, permissions of a plurality of on-premise front-end services associated with permissions to access one or more on-premise back-end services in the private cloud according to the present principles. A service determiner/tracker 406 may detect and/or track service requests, and a router/offloader 408 may send service requests to an offloading server for processing according to the present principles. The router 408 may also redirect service requests if errors are encountered during execution of the service request.

A firewall 410 may determine whether access to particular back-end services in the private cloud is authorized to the offloaded services (e.g., based on firewall policy), and an error may be returned if the access is unauthorized. For example, the firewall may return an error to the offloaded services and the offloaded services may return an error to an on-premise router if an access request is determined to be unauthorized. A service request executor 412 may execute the service request using services in the private cloud, services in the public cloud, or a combination of services in the private and public clouds according to various embodiments.

In one embodiment, a mapper/permission list generator may generate and/or update permission mappings in the firewall 410 between the offloaded services and the logged back-end services to generate an updated firewall policy for authorizing future access requests by the offloaded services. The updated firewall policy/permission list may be stored in a storage device 416 (e.g., non-transitory computer readable storage medium) Subsequent access requests to the logged back-end services may be allowed or blocked using a controller 418 (e.g., local, global, etc.) based on the updated firewall policy according to various embodiments of the present principles.

In the embodiment shown in FIG. 4, the elements thereof are interconnected by a bus 401. However, in other embodiments, other types of connections can also be used. Moreover, in an embodiment, at least one of the elements of system 400 is processor-based and/or a logic circuit. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 400 are readily determined by one of ordinary skill in the art, given the teachings of the present principles provided herein, while maintaining the spirit of the present principles.

Figure 5:
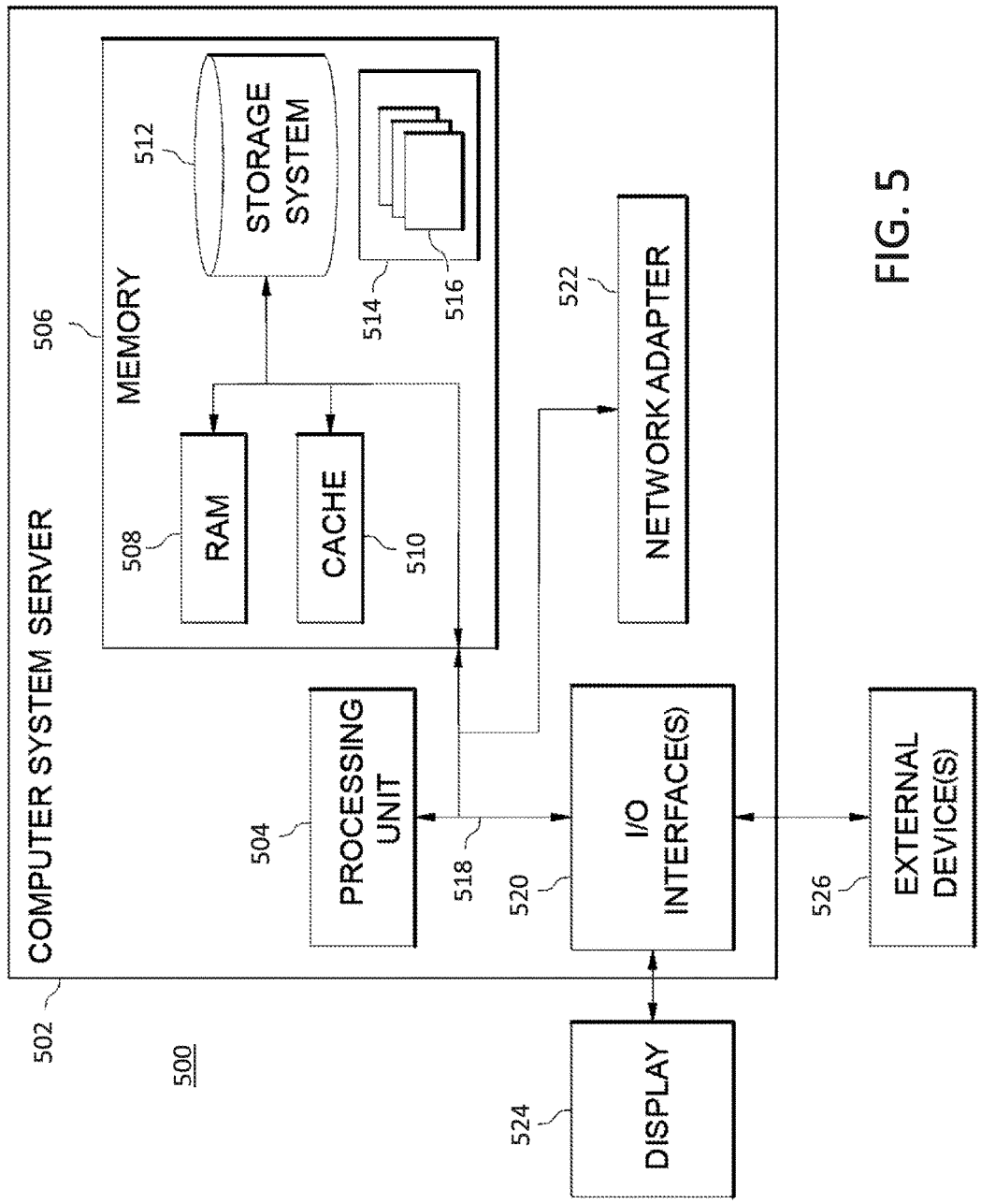
FIG. 5 depicts an exemplary cloud computing node, in accordance with an embodiment of the present principles.

Referring now to FIG. 5, a schematic of an example of a cloud computing node 500 is shown. Cloud computing node 500 is only one example of a suitable cloud computing node and is not intended to suggest any limitation as to the scope of use or functionality of embodiments of the invention described herein. Regardless, cloud computing node 500 is capable of being implemented and/or performing any of the functionality set forth hereinabove.

In cloud computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose (or special purpose) computing device. The components of computer system/server 502 may include, but are not limited to, one or more processors or processing units 504, a system memory 506, and a bus 518 that couples various system components including system memory 506 to processor 504.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media.

System memory 506 can include computer system readable media in the form of volatile memory, such as random access memory (RAM) 508 and/or cache memory 510. Computer system/server 502 may further include other removable/non-removable, volatile/non-volatile computer system storage media. By way of example only, storage system 512 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 506 may include at least one program product having a set (e.g., at least one) of program modules that are configured to carry out the functions of embodiments of the invention.

Program/utility 514, having a set (at least one) of program modules 516, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

Computer system/server 502 may also communicate with one or more external devices 526 such as a keyboard, a pointing device, a display 524, etc.; one or more devices that enable a user to interact with computer system/server 502; and/or any devices (e.g., network card, modem, etc.) that enable computer system/server 502 to communicate with one or more other computing devices. Such communication can occur via Input/Output (I/O) interfaces 520. Still yet, computer system/server 502 can communicate with one or more networks such as a local area network (LAN), a general wide area network (WAN), and/or a public network (e.g., the Internet) via network adapter 522. As depicted, network adapter 522 communicates with the other components of computer system/server 502 via bus 518. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Figure 6:
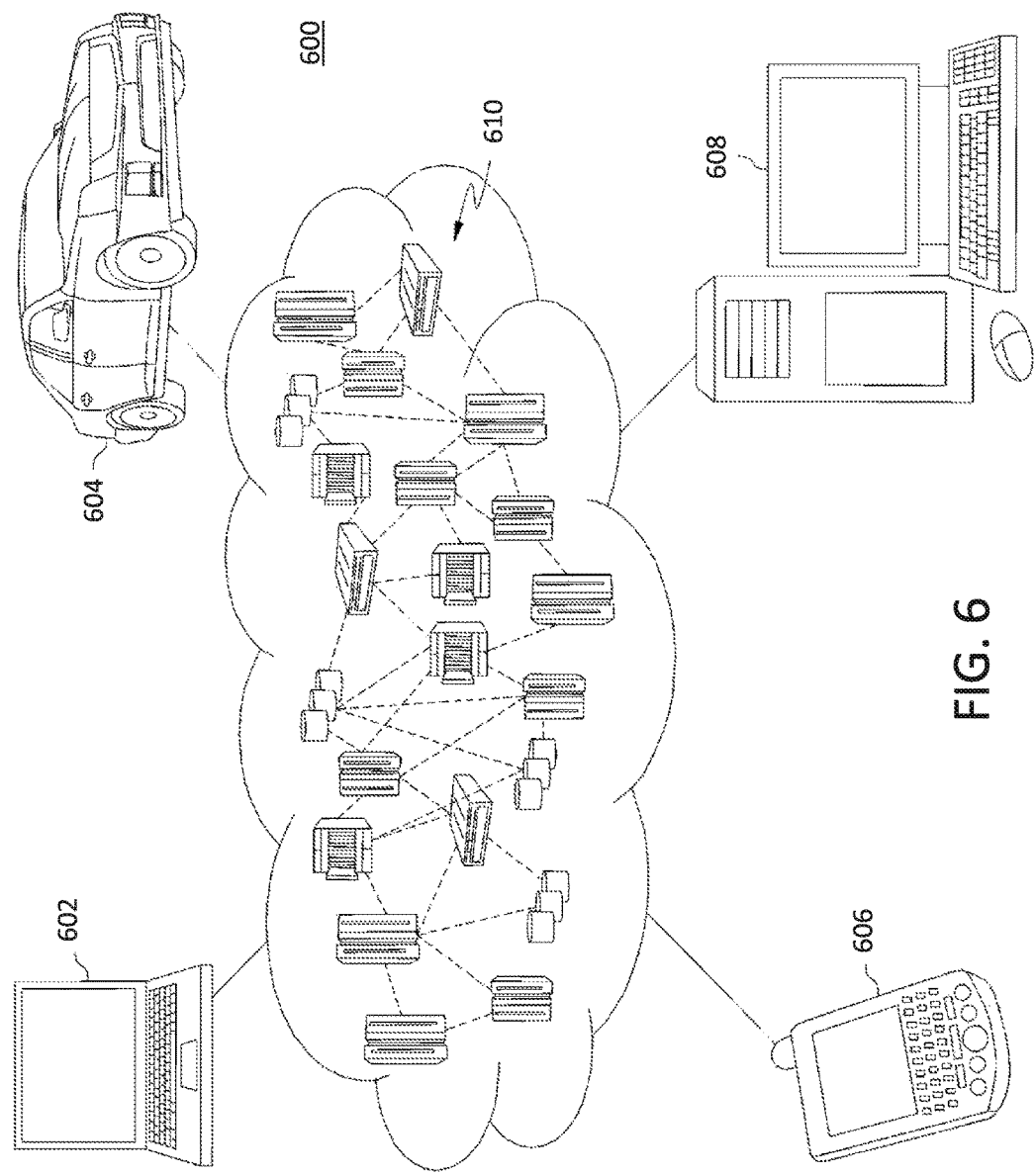
FIG. 6 depicts an exemplary cloud computing environment, in accordance with an embodiment of the present principles.

Referring now to FIG. 6, an exemplary cloud computing environment 600 is illustratively depicted in accordance with an embodiment of the present principles. As shown, cloud computing environment 600 comprises one or more cloud computing nodes 610 with which local computing devices used by cloud consumers, such as, for example, personal digital assistant (PDA) or cellular telephone 606, desktop computer 608, laptop computer 602, and/or automobile computer system 604 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 602, 604, 606, and 608 shown in FIG. 6 are intended to be illustrative only and that computing nodes 610 and cloud computing environment 600 can communicate with any type of computerized device over any type of network and/or network addressable connection (e.g., using a web browser).

Referring now to FIG. 7 a set of functional abstraction model layers 700 provided in a cloud computing environment 600 (FIG. 6) are illustratively depicted in accordance with an embodiment of the present principles. It should be understood in advance that the components, layers, and functions shown in FIG. 7 are intended to be illustrative only and embodiments of the invention are not limited thereto. As depicted, the following layers and corresponding functions are provided:

Hardware and software layer 702 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 704 provides an abstraction layer from which the following examples of virtual entities may be provided: virtual servers; virtual storage; virtual networks, including virtual private networks; virtual applications and operating systems; and virtual clients.

In one example, management layer 706 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 708 provides examples of functionality for which the cloud computing environment may be utilized. Examples of workloads and functions which may be provided from this layer include: mapping and navigation; software development and lifecycle management; virtual classroom education delivery; data analytics processing; transaction processing; and controlling access to services located in a private cloud by services offloaded to a public cloud (e.g., by determining and building a firewall policy based on workload profiling for services offloaded to PaaS) according to various embodiments of the present principles.

The present principles may be employed for permission based access control for cloud-based offloaded services in a plurality of situations, including, for example, mobile image distribution of a server (e.g., Worklight® server), and service relocation (e.g., from green to yellow zones) according to various embodiments. With respect to the mobile image distribution of Worklight® servers, it is noted that Worklight® may store mobile application images and authentication information (application-unique) in its database DB2 (backend) and its offloaded service in the cloud may distribute the latest images to clients.

This offloaded service may sometimes access other back-end services (e.g., to process authentication errors), but if the accesses to these backend services are not registered in an ACL, then access is conventionally denied. However, access may be granted by re-executing the denied offloaded service in an on-premise system (e.g., in private cloud) and generating a mapping between the service in the private cloud and the offloaded service for future use according to various embodiments of the present principles. In contrast, conventional systems and methods would return an error to the end user, and the requested service would never be available to the end user in the above situation.

In one embodiment, with respect to service relocation (e.g., from green to yellow zones), a web application (e.g., Servlet, Java Server Page (JSP), etc.) may access, for example, Java 2 Platform, Enterprise Edition (J2EE) services (e.g., Session Beans). These J2EE services may call backend services (e.g., database (DB), messaging and queuing (MQ), etc.). J2EE services are generally located in a green zone, but sometimes may be re-located to a yellow zone (e.g., to improve latency). Because developers and administrators of the services are usually different people, it is difficult (if not impossible) to list all of the backend services called by each of a plurality of J2EE services. Any denied offloaded services may be re-executed in a yellow zone according to various embodiments of the present principles, but conventional systems and methods would simply return an error to end-users from a web application, and will not attempt any re-execution of the offloaded services.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for network access control, comprising:
sending a service request from an on-premise system to one or more offloaded front-end services on one or more offloading servers;
monitoring requests by the offloaded services to access back-end services in one or more on-premise systems, wherein access requests by the offloaded services for unauthorized back-end services are denied;
redirecting and locally executing the service request to generate logs of the back-end services used to perform the service request if the access requests are denied; and
updating a permission mapping in a firewall between the offloaded services and the logged back-end services to permit future access requests by the offloaded services.

2. The method as recited in claim 1, wherein the service request is speculatively sent to the offloading servers.

3. The method as recited in claim 1, wherein the offloading servers are located in a public cloud.

4. The method as recited in claim 1, wherein the on-premise systems are located in a private cloud.

5. The method as recited in claim 1, wherein a firewall policy is generated and dynamically maintained in real-time based on the updated permission mappings in the firewall.

6. The method as recited in claim 1, wherein an error is returned to a router if requests for unauthorized back-end services are detected, and the router redirects execution of the service request to an on-premise system in response to the error.

7. The method as recited in claim 4, wherein the private cloud includes a router for sending and redirecting the service request.

8. The method as recited in claim 6, wherein the firewall notifies the offloaded service of the error, and the offloaded service notifies the router of the error.

9. The method as recited in claim 1, further comprising determining, using a firewall, whether access to particular back-end services in the private cloud is authorized to the offloaded services, wherein the firewall returns an error to the offloaded services and the offloaded services return an error to an on-premise router if the access is unauthorized.

10. A system for network access control, comprising:
   a controller for sending a service request from an on-premise system to one or more offloaded front-end services on one or more offloading servers;
   a network monitor for detecting requests by the offloaded services to access back-end services in one or more on-premise systems,
      wherein access requests by the offloaded services for unauthorized back-end services are denied, and
      wherein the controller redirects and locally executes the service request to generate logs of the back-end services used to perform the service request if the access requests are denied; and
   a firewall configured to permit the access requests by the offloaded services by updating a permission mapping in the firewall between the offloaded services and the logged back-end services.

11. The system as recited in claim 10, wherein the service request is speculatively sent to the offloading servers.

12. The system as recited in claim 10, wherein the offloading servers are located in a public cloud.

13. The system as recited in claim 10, wherein the on-premise systems are located in a private cloud.

14. The system as recited in claim 10, wherein a firewall policy of the firewall is generated and dynamically maintained in real-time based on the updated permission mapping in the firewall.

15. The system as recited in claim 10, wherein an error is returned to a router if requests for unauthorized back-end services are detected, and the router redirects execution of the service request to an on-premise system in response to the error.

16. The system as recited in claim 13, wherein the private cloud includes a router for sending and redirecting the service request.

17. The system as recited in claim 15, wherein the firewall notifies the offloaded service of the error, and the offloaded service notifies the router of the error.

18. The system as recited in claim 10, wherein the firewall is further configured to determine whether access to particular back-end services in the private cloud is authorized to the offloaded services, wherein the firewall returns an error to the offloaded services and the offloaded services return an error to an on-premise router if the access is unauthorized.

19. A computer readable storage medium comprising a computer readable program for providing access to one or more back-end services in a private cloud by one or more offloaded services in a public cloud, wherein the computer readable program when executed on a computer causes the computer to perform the steps of:
   sending a service request from the private cloud to one or more offloaded front-end services in the public cloud;
   monitoring requests by the offloaded services to access back-end services in the private cloud, wherein access requests by the offloaded services for unauthorized back-end services are detected and denied;
   redirecting and locally executing the service request to generate logs of the back-end services used to perform the service request if the access requests are denied; and
   updating a permission mapping in a firewall between the offloaded services and the logged back-end services to permit future access requests by the offloaded services.

20. The computer readable storage medium as recited in claim 19, wherein the service request is speculatively sent to the offloading servers using an on-premise router.

* * * * *